United States Patent [19]

Momiyama et al.

[11] Patent Number: 4,723,142
[45] Date of Patent: Feb. 2, 1988

[54] FOCUS DETECTING DEVICE

[75] Inventors: Kikuo Momiyama; Kazuo Fujibayashi, both of Kanagawa; Keiji Ohtaka, Tokyo, all of Japan

[73] Assignee: Canon Kabushiki Kaisha, Tokyo, Japan

[21] Appl. No.: 926,808

[22] Filed: Oct. 30, 1986

Related U.S. Application Data

[63] Continuation of Ser. No. 703,738, Feb. 21, 1985, abandoned.

[30] Foreign Application Priority Data

Feb. 21, 1984 [JP] Japan ................... 59-30903

[51] Int. Cl.$^4$ .............................................. G03B 3/00
[52] U.S. Cl. ................................................... 354/403
[58] Field of Search ............... 354/403, 402; 350/201, 350/201 AF; 355/255

[56] References Cited

U.S. PATENT DOCUMENTS

| | | | |
|---|---|---|---|
| 3,836,919 | 9/1974 | Matsumoto et al. | 354/403 |
| 4,323,303 | 4/1982 | Enomoto | 354/402 |
| 4,357,085 | 11/1982 | Niwa et al. | 354/403 |
| 4,394,077 | 7/1983 | Yoshino et al. | 354/403 |
| 4,618,762 | 10/1986 | Hattori et al. | 354/403 X |

Primary Examiner—W.B. Perkey
Attorney, Agent, or Firm—Toren, McGeady & Associates

[57] ABSTRACT

The disclosed device prevents degradation of distance measurement accuracy due to alignment error in the mounting of a detachable lens barrel on a camera body. The lens barrel houses a focusing objective lens and a first distance measurement position is set along the optical path of the objective lens within the lens barrel. A second distance measuring position is set within the camera body. A light projector is positioned at one of the distance measuring positions and projects a measuring beam, and a photo detector is positioned at the other of the distance measuring positions to receive a reflection beam from the object being measured to produce a signal to be used for focus adjustment.

10 Claims, 9 Drawing Figures

FOCUS DETECTING DEVICE

This is a continuation of application Ser. No. 703,738, filed Feb. 21, 1984, now abandoned.

BACKGROUND OF THE INVENTION

1. Field of the Invention

This invention relates to a full automatic or semiautomatic focusing camera using an interchangeable photo taking lens and more particularly to a camera of the kind arranged to project a focus point detecting light flux or beam through the photo taking lens and to detect through the photo taking lens a light flux or beam reflected by an object.

2. Description of the Prior Art

The focus detecting device of the kind arranged to project a light flux or beam on an object to be photographed and to detect a focus point by receiving a reflection light flux from the object has been known as advantageous in that: The system of this kind is capable of detecting the focus point even in the event of a dark object or an object having a low degree of contrast. In addition, it gives no parallax in an in-focus state. Further, it is capable of preventing the degradation of focus detection accuracy due to the surface reflection of the photo taking lens.

FIG. 1 of the accompanying drawings shows by way of example the optical system of the light projecting type focus detecting device of the kind mentioned above. The illustration includes a photo taking lens 1 which is attachable to and detachable from a camera body; a light emitting element 2 disposed within the camera body; a light receiving lens 3; and a light receiving photo-sensitive element 4. Both the light receiving lens 3 and the photo-sensitive element 4 are disposed on the camera body. The light emitting element 2 is arranged on the optical axis O of the photo taking lens 1. A beam of light emitted from the light emitting element 2 is projected via the photo taking lens 1 on the surface of an object to be photographed. The projection light flux or beam thus obtained has the optical axis of the photo taking lens 1 at the center thereof irrespective of the focal point of the lens 1 and the object distance. A resultant reflection light flux from the object comes through the light receiving lens 3 to be imaged on the photo-sensitive element 4. In accordance with the principle of triangulation, the displacement D of the center position of the received light flux imaged on the photo-sensitive element 4 can be expressed as follows from the object distance R, a base length L which is a distance between the optical axis O of the projected light flux and the optical axis P of the received light flux and a distance S between the light receiving lens 3 and the photo-sensitive element 4:

$$D = \frac{L}{R} \times S \quad (1)$$

In other words, the displacement D of an imaging position on the photo-sensitive element 4 is determined by the object distance. Conversely, the object distance R can be determined by obtaining the displacement D of the imaging position of the received light flux on the photosensitive element 4. Then, the focus is adjustable by controlling the focal point of the photo taking lens 1 according to the object distance R thus obtained.

Meanwhile, in the camera of the kind using an interchangeable photo taking lens, the optical axis of the photo taking lens sometimes deviates from that of the camera and thus becomes eccentric when the former is mounted on the latter.

FIG. 2 schematically shows the focusing optical system of FIG. 1 as in a state of having the photo taking lens 1 mounted with some eccentricity $\Delta Y$. Assuming that the focal length of the lens 1 is f, the imaging displacement D of the received light flux on the photo-sensitive element 4 varies to a displacement D′ and there arises an error $\Delta D$ as apparent from FIG. 2. The degree of this error $\Delta D$ can be expressed from a light projection angle error $\Delta \theta$ (in radian) $= \Delta Y/f$ as shown below:

$$\Delta D = \frac{\Delta Y}{f} \times S \quad (2)$$

With respect to a focusing error $\Delta x$ which results from this eccentricity $\Delta Y$, the deviating degree $\Delta D$ of the light flux and an object distance error $\Delta R$ can be expressed as follows by differentiating both members of Formula (1):

$$\Delta D = \frac{L}{R^2} \times S \times \Delta R \quad (3)$$

Further, from the image formation formula, a relation between the object distance error $\Delta R$ and the focusing error $\Delta x$ can be expressed as follows:

$$\Delta x = \frac{f^2}{R^2} \times \Delta R \quad (4)$$

A relation between the eccentricity $\Delta Y$ of the photo taking lens and the focusing error $\Delta \Delta$ can be expressed from Formulas (2), (3) and (4) as shown below:

$$\Delta x = \frac{f}{L} = x \Delta Y \quad (5)$$

as will be apparent from Formula (5) above, in the event of a long focal length f of the photo taking lens 1 preventing arrangement to have a large base length L, a large focusing error results even from a slight eccentricity of the lens 1.

For example, assuming that the photo taking lens 1 has a focal length f=100 mm and a brightness (or aperture) of F/2.8 and that the base length L is 30 mm, in order to reduce the degree of blur due to the focusing error to a value less than an allowable diameter of circle of confusion $\phi = 0.035$ mm, the value of an allowable eccentricity $\Delta Y$ of the photo taking lens can be obtained from Formula (5) as $\Delta Y = 30/100 \times (2.8 \times 0.035) \div 0.03$. The allowable eccentricity $\Delta Y$ thus must be set at a value less than 0.03. However, such an allowable eccentricity is considered too severe for a camera of the kind arranged to have an interchangeable lens mounted thereon because of the eccentricity due to the play allowed for mounting.

Thus, with the optical axis of the photo taking lens deviating from the optical axis of the camera body, there have been the fear of degradation of focusing accuracy resulting from that the reflection light flux or beam from the object is received by the photo-sensitive element with some error.

Meanwhile, Japanese Laid-Open Patent Application No. SHO 57-73709 (corresponding to U.S. Pat. No. 4,394,077) has disclosed a camera equipped with a light projecting type focus detecting device. According to the disclosure, a light receiver is arranged within a camera body while a light projector is disposed in a lens barrel. However, since the light receiver which is arranged within the camera body is disposed behind the photo taking lens, the invention disclosed seems to have paid no heed to the above-stated problem of eccentricity.

SUMMARY OF THE INVENTION

It is an object of this invention to provide a camera which is using an interchangeable photo taking lens and is capable of accurately performing a light projecting type focus detecting operation.

It is another object of this invention to provide novel means for ensuring that deviation of the optical axis of a photo taking lens from a reference axis arising in mounting the lens on a camera body is prevented from affecting the accuracy of distance measurement.

These and further objects and features of the invention will become apparent from the following detailed description of preferred embodiments thereof taken in connection with the accompanying drawings.

DETAILED DESCRIPTION OF THE PREFERRED EMBODIMENTS

Figure 1:
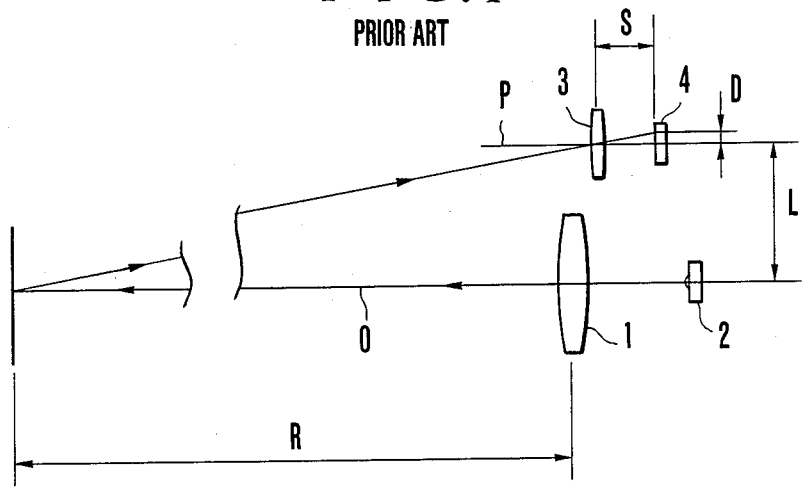
FIG. 1 Is a schematic illustration of a known focus detecting optical system.
Figure 2:
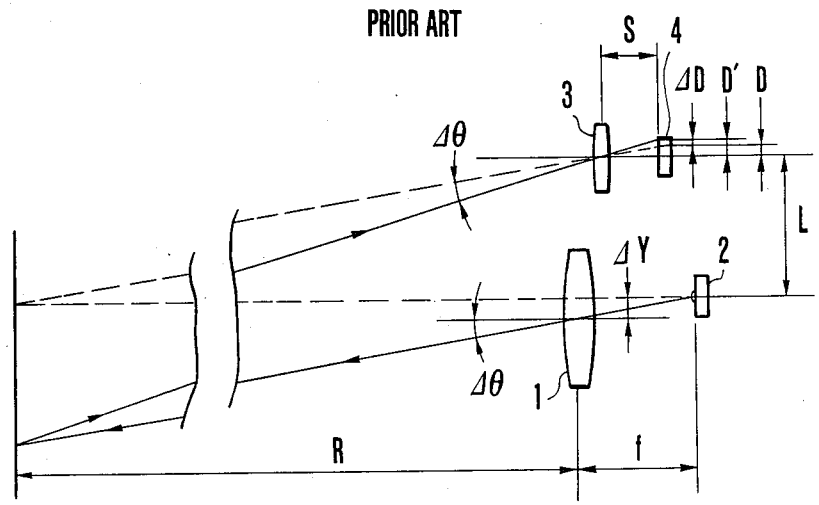
FIG. 2 shows the same optical system as in a state of having the distance measurement accuracy of the system degrared due to eccentricity.
Figure 3:
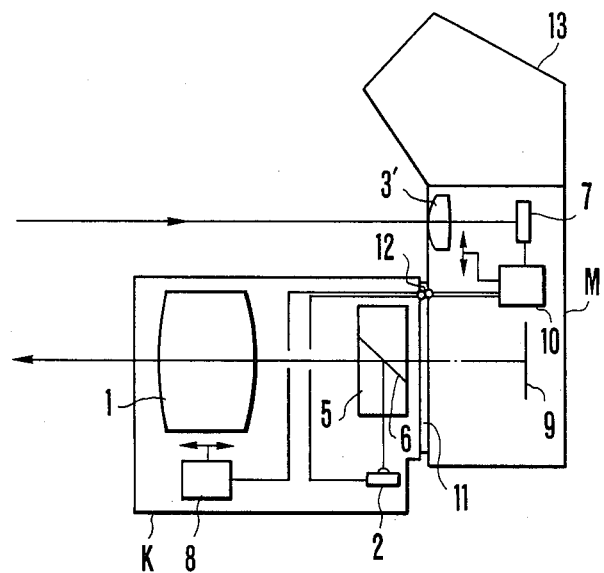
FIG. 3 is an optical sectional view showing a first embodiment of this invention.

FIG. 3 shows a focus detecting device arranged according to this invention as an embodiment thereof. The illustration includes a photo taking lens body K. An objective lens 1 is disposed within a lens barrel. A beam splitting prism 5 is disposed within the lens barrel behind the lens 1 on the optical axis thereof. The beam splitting prism 5 is provided with a reflection surface 6 which is obliquely formed on the optical axis of the objective lens 1 and is arranged to reflect infrared rays and to transmit visible rays. A light emitting element 2 which is an LED or the like is disposed within the lens barrel and on an optical path split by the beam splitting prism 5. An invisible beam emitted from the light emitting element 2 is reflected by the reflection surface 6 of the beam splitting prism 5 and passes through the objective lens 1 along the optical axis of the lens to be photographed which is not shown but is located in front of the lens 1.

A camera body M is provided with a light receiving lens 3' which is disposed at the front of the casing of the camera body. Behind the light receiving lens 3' is disposed a light receiving photo-sensitive element part 7 which is on the optical axis of the lens 3'. A reflection beam from the object is thus arranged to come through the light receiving lens 3' and to be imaged on the photo-sensitive element part 7, which will be described in detail later herein. The light receiving lens 3' is shiftable up and down perpendicularly to the optical axis O of the objective lens 1. Meanwhile either the whole or a part of the objective lens 1 is arranged to be shiftable on the optical axis thereof by a driving mechanism 8 according to the shifting extent of the light receiving lens 3'. The focal point of the lens 1 is adjustable with the lens shifted in that manner. The illustration further includes a photographic film 9 and a circuit 10 which is arranged to process a signal produced from the photo-sensitive element part 7. The circuit 10 may be disposed either within the photo taking (or objective) lens body K or within the camera body M. A coupling bayonet 11 is arranged to couple the lens body K with the camera body M. A terminal 12 is provided for connecting signal lines. A reference numeral 13 denotes a view finder.

Figure 4:
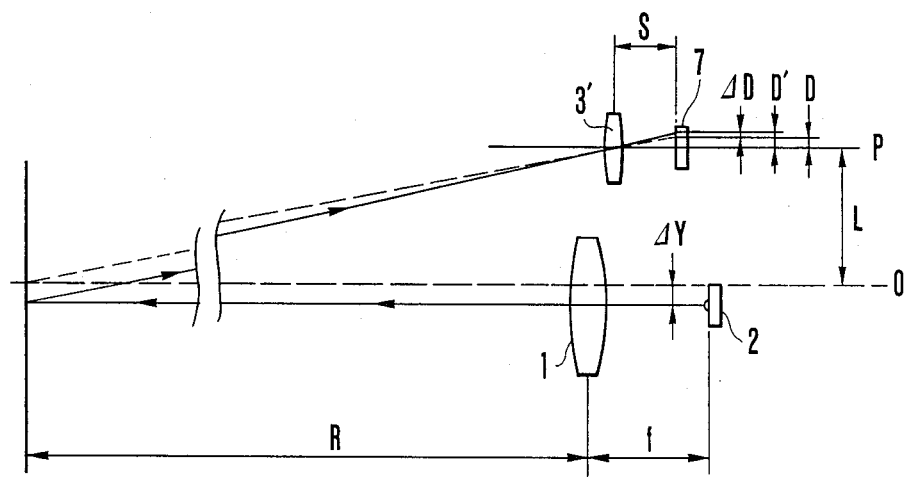
FIG. 4 schematically shows the optical operation of the first embodiment.

Next, in the event of eccentricity of the optical axis of the photo taking lens body K relative to the camera body M in the focusing optical system, the embodiment operates as follows: FIG. 4 schematically shows the focusing optical system of the focus detecting device arranged according to the invention as shown in FIG. 3. Referring to FIG. 4, a reference symbol R denotes a distance between the objective lens 1 and the object to be photographed; L denotes a base length which is a distance between the optical axis O of the camera and the light receiving optical axis P; S denotes a distance between the light receiving lens 3' and the photosensitive element part 7; and f denotes the focal length of the objective lens 1.

With eccentricity $\Delta Y$ arising between the optical axes of the lens body K and the camera body M, the imaging displacement D of the received beam (or light flux) on the photosensitive element part 7 varies to a displacement D' as shown in FIG. 4. This results in an error $\Delta D$. Since the beam from the light emitting element 2 is projected through the optical axis of the objective lens 1 onto the object to be photographed, the error $\Delta D$ can be expressed as shown below:

$$\Delta D = \frac{\Delta Y}{R} \times S \qquad (6)$$

Further, from Formulas (3), (4) and (6), the relation of the eccentricity between the lens body K and the camera body M to a focusing error $\Delta x$ can be expressed as follows:

$$\Delta x = \frac{f^2}{LR} \times \Delta Y \qquad (7)$$

Normally, the object distance R is sufficiently longer than the focal length f of the objective lens 1. Therefore, the focusing error $\Delta x$ due to the eccentricity $\Delta Y$ presents no problem. For example, in case where the focal length f of the lens 1 is 100 mm the brightness or the maximum aperture of the lens is F/2.8, the base length L is 30 mm and the photographing distance R is 5000 mm, the allowable eccentricity $\Delta Y$ which is necessary for having the degree of blur due to the focusing error below the allowable diameter of circle of confusion $\phi = 0.035$ mm is obtained from formula (7) as follows:

$$\Delta Y < \frac{30 \times 5000}{100^2} \times (2.8 \times 0.035).$$

Thus, the allowable eccentricity $\Delta Y$ becomes $\Delta Y < 1.47$ mm. Therefore, the allowable eccentricity increases to a considerable degree.

As mentioned in the foregoing, this embodiment can be arranged to have the focusing error within an allowable range by virtue of having the light emitting element disposed within the lens body and thus gives a high degree of focusing accuracy even if the lens is mounted on the camera body with the optical axes of the camera body and the lens body deviating from each other. Further, with the light receiving photo-sensitive element part disposed within the camera body, it can be easily electrically connected to a processing circuit, etc. Besides, the lens body can be arranged at a low cost.

Figure 5:
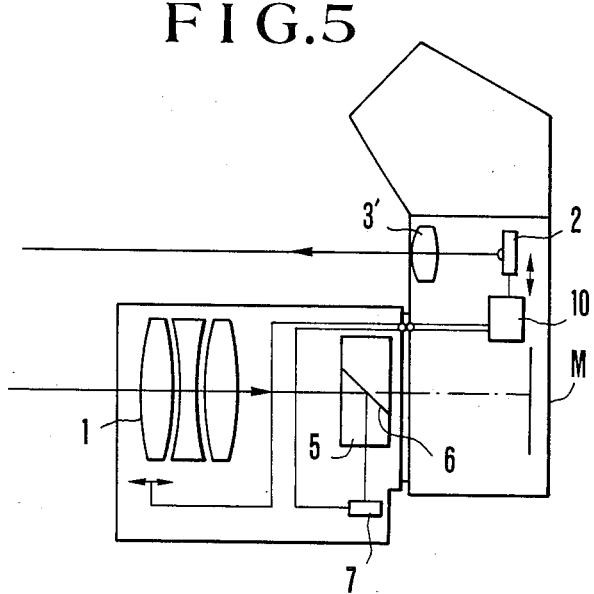
FIG. 5 is an optical sectional view showing a second embodiment of the invention.

Further, the locations of the light emitting element 2 and the photo-sensitive element part 7 may be interchanged as shown in FIG. 5. In that instance, the light projecting lens on the side of the camera body can be arranged to have small diameter by employing a high luminance light source such as an LED or a semiconductor laser having directivity. Then, compared with the case where the light receiving means is disposed on the side of the camera body, the distance measuring lens on the side of the camera body can be arranged to be not outstanding in appearance without changing the farthest measurable distance. The beam splitting prism may by arranged in a void space available within the objective lens. The beam splitting prism may be replaced with a mirror.

Figure 6:
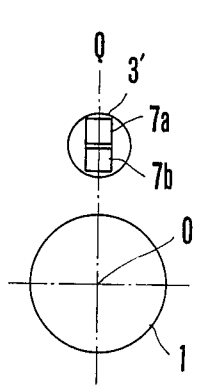
FIG. 6 shows the arrangement of a photo sensor.

FIG. 6 shows an example of the photo-sensitive element part 7 arranged according to this invention. The part 7 in this specific embodiment consists of a first photosensitive element 7a and a second photo-sensitive element 7b. The first and second elements 7a and 7b are slightly spaced and aligned on a perpendicular line Q which are perpendicularly crossing the optical axis of the objective lens 1.

In this embodiment, an in-focus state is considered to have been attained when a received beam of light is imaged in the middle part between the first and second photo-sensitive elements 7a and 7b. To obtain this in-focus state, the light receiving lens 3' is moved along the perpendicular line Q according to a distance to an object to be photographed. The focal point of the lens 1 is adjusted to an extent corresponding to the shifting extent of the light receiving lens. This focus adjustment operation is accomplished through the use of a known electric circuit and a known mechanism interlocked to the circuit. Since such a circuit and a mechanism are known, they are not shown and omitted from description.

Figure 7A:
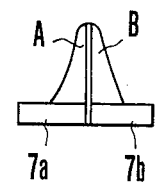
FIGS. 7(a), 7(b) and 7(c) are illustrations of a relation between the light receiving arrangement of the photo sensor and a focusing state.
Figure 7B:
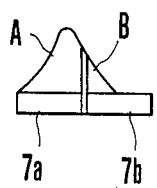
Figure 7C:
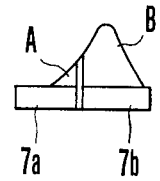

FIGS. 7(a), 7(b) and 7(c) respectively show different light beam receiving state of the light receiving photo-sensitive element part 7. FIG. 7(a) shows an in-focus state, in which the light quantity A received by the first photosensitive element 7a is equal to the light quantity B received by the second photo-sensitive element 7b. FIG. 7(b) shows a far-focus state, in which the light quantity A received by the first element 7a is larger than the light quantity B received by the second element 7b. FIG. 7(c) shows a near-focus state, in which the light quantity B received by the second element 7b is larger than the light quantity A received by the first element 7a.

In the event of the light receiving state shown in FIG. 7(b) or 7(c), therefore, the light receiving lens 3' is vertically shifted to eliminate the difference between the received light quantity (output) A of the first photosensitive element 7a and that of the second element 7b, i.e. to obtain the in-focus state as shown in FIG. 7(a). With these different focusing states thus detected, the focal point of the photo taking lens can be automatically adjusted.

While the embodiment described above is arranged to have the received beam of light imaged in the middle portion of the photo-sensitive element part by shifting the light receiving lens, this arrangement may be replaced with arrangement to have the received beam of light imaged in the middle portion by shifting the photo-sensitive element part instead of shifting the light receiving lens.

Further, in the embodiment described, the in-focus position of the photo taking or objective lens is determined by detecting a position where the difference between the outputs of the two photo-sensitive elements becomes zero. However, in accordance with this invention, it is also possible to detect the position of the center of gravity of the received beam of light by means of a photo-sensor array of CCD or the like and to control the focal point of the photo taking lens on the basis of that position.

In accordance with this invention, as described in the foregoing, the focusing accuracy can be greatly enhanced. The invention enables even the camera of the kind using an interchangeable photo taking lens to perform a focusing operation at a high degree of accuracy. The invention, therefore, has a great advantage for practical applications.

What is claimed is:

1. A device comprising:
   a camera body;
   a lens barrel which houses objective optical means and is attachable to and detachable from said camera body;
   a first distance measuring position set on the optical path of said objective optical means within said lens barrel;
   a second distance measuring position set at a place within said camera body where a light flux, which passes through the objective optical means to an image side, does not reach;
   light projecting means which is arranged at one of said first and second distance measuring positions to project a beam of light on an object to be photographed; and
   photo detector means which is arranged at the other of said distance measuring positions to receive a beam of light from said object and to produce a signal to be used for focus adjustment, wherein one of said beam of light to be projected on the object and said beam of light received from the object does not pass through the objective optical means.

2. A device according to claim 1, wherein said photo detector means includes a convergent optical element and a photo-electric converting sensor.

3. A device according to claim 1, wherein said photo detector means includes a beam splitter and a photo-electric converting sensor.

4. A device according to claim 2, or 3, wherein said photo-electric converting sensor is provided with a plurality of light receiving areas.

5. A device according to claim 4, wherein said photo-electric converting sensor is provided with two light receiving areas.

6. A device according to claim 4, wherein said photo-electric converting sersor is provided with an array of light receiving areas.

7. A device according to claim 1, wherein said light projecting means includes a convergent optical element and a light source.

8. A device according to claim 1, wherein said light projecting means includes a beam splitter and a light source.

9. A photo taking lens comprising:
a lens barrel;
an objective disposed within said lens barrel;
adjusting means for focusing adjustment of said objective;
beam splitting means arranged within said lens barrel to split the optical path of said objective;
a light source arranged on a split optical path of said objective to project a beam along said optical path of the object to be photographed;
coupling means provided on said lens barrel for coupling said lens barrel with a camera body; and
connecting means for electrically connecting said adjusting means to a photo sensor which is disosed behind a convergent optical element fixed to an optical axis and arranged in front of said camera body for directly sensing the beam of light reflected from the object without going through said objective.

10. A camera system comprising:
a camera body;
a lens barrel;
an objective disposed within said lens barrel;
adjusting means for focusing adjustment of said objective;
beam splitting means arranged within said lens barrel to split the optical path of said objective;
a photo sensor being provided within said lens barrel and arranged on a split optical path of said objective to receive a beam of light coming through said optical path of said objective from an object to be photographed;
coupling means provided on said lens barrel for coupling said lens barrel with said camera body; and
connecting means provided at said lens barrel for connecting said photo sensor to a light source which is arranged behind a convergent optical element to project a beam from a convergent optical element directly to an object to be photographed without going through said objective, said convergent optical element being disposed in front of said camera body.

* * * * *